United States Patent [19]

Nakamura

[11] Patent Number: 4,682,171
[45] Date of Patent: Jul. 21, 1987

[54] TURN-AND-BANK INDICATOR WHICH DISPLAYS THE TOTAL ANGLE OR TOTAL TIME OF A TURN

[75] Inventor: Shuji Nakamura, Komae, Japan

[73] Assignee: Tokyo Aircraft Instrument Co., Ltd., Tokyo, Japan

[21] Appl. No.: 729,159

[22] Filed: Apr. 30, 1985

[51] Int. Cl.[4] ............... G01C 23/00; G01C 21/00
[52] U.S. Cl. .................... 340/975; 33/328; 33/330; 73/178 R; 244/1 R; 340/971; 340/974
[58] Field of Search ............. 340/967, 971, 975, 974, 340/979, 963; 33/328, , 329, 330; 73/180, 178 R, 178 T, 504, 179, 178 H; 244/1 R, 179, 181; 116/47; 364/433, 434

[56] References Cited

U.S. PATENT DOCUMENTS

| 2,815,584 | 12/1957 | Watson | 33/328 |
|---|---|---|---|
| 3,059,233 | 10/1962 | Guarino et al. | 340/979 |
| 3,213,416 | 10/1965 | Joline | 340/975 |
| 3,369,397 | 2/1968 | Alth | 73/179 |
| 3,577,120 | 5/1971 | Sherbert, Jr. | 340/971 |
| 3,577,195 | 5/1971 | Clift | 340/975 |
| 3,624,365 | 11/1971 | Woodworth | 33/328 |
| 3,631,476 | 12/1971 | Schaffer | 73/178 R |
| 3,891,832 | 6/1975 | Rodgers et al. | 340/979 |
| 4,006,632 | 2/1977 | Saverio | 73/178 R |
| 4,415,879 | 11/1983 | Brady et al. | 73/178 R |
| 4,531,298 | 7/1985 | West, Jr. | 73/178 R |

FOREIGN PATENT DOCUMENTS 0610855 10/1948 United Kingdom ............ 340/974

Primary Examiner—Donnie L. Crosland
Assistant Examiner—Brent A. Swarthout
Attorney, Agent, or Firm—Spencer & Frank

[57] ABSTRACT

A turn-and-bank indicator can integrate with regard to time the displacement of a pointer of the turn-and-bank indicator, the pointer indicating the turning rate of the airplane. It includes a non-contact converter which outputs an electrical signal in proportion to the deflection of the pointer; an amplifier which amplifies the output of the non-contact converter; an integrator which integrates the output of the amplifier with respect to time; and a digital display unit which displays the output from the integrator at a close position with the pointer.

6 Claims, 9 Drawing Figures

TURN-AND-BANK INDICATOR WHICH DISPLAYS THE TOTAL ANGLE OR TOTAL TIME OF A TURN

BACKGROUND OF THE INVENTION

The present invention relates to a turn-and-bank indicator which can indicate the turning time or angle of an airplane.

In any of the airplanes a turn-and-bank indicator is mounted and it indicates the turning rate of the airplane when it turns.

FIG. 1 shows a front view of such a usually used conventional turn-in-bank indicator.

It is general that a pointer 1 of the conventional turn-and-bank indicator is operated by a gyro. Gyrogimbals are restrained by a return spring and so they rotate freely, but only at a limited range, around the X axis of the airplane while it is made not rotatable around the Z axis. The rotational axle of the gyro is horizontal and rotates around the Y axis, while the gimbals are provided with a pivot in the direction of the X axis, as clearly shown in FIG. 9. With the structure above mentioned, the power generated by the turning of the airplane is changed into precession torque, and the pointer 1 moves and makes an indication which is in proportion to the turning angular velocity. According to the turn-and-bank indicator shown in FIG. 1, the width of each of three indicating scales 2 is made equal to the width of the pointer 1, and the turning of the airplane corresponding to the movement of the pointer 1 for its width is called the pointer width turning or the coordinate turning. The numeral 3 shows a bank indicater.

In the case of the coordinate turning of the above turn-and-bank indicator, two types are generally known, one which represents 180°/min. turning angle velocity and the other of 90°/min. They are called two and four minute turning indicators, respectively. Usually, the four minute turning indicators have been used in larger airplanes. Conventionally, the operator has started the coordinate turning by confirming the second hand of a watch and terminated the turning after the lapse of time corresponding to the desired turning angle.

An object of this invention is to provide a turn-and-bank indicator which may give an indication of the turning rate of the airplane by the pointer and simultaneously may digitally display the integration with respect to time of the amount of the displacement of the pointer of the turn-and-bank indicator. In other words, the object of the present invention is to provide a turn-and-bank indicator in which the lapsed turning time or turning angle can be displayed on the dial of the turn-and-bank indicator, to which the pilot pays his attention most frequently when the airplane is turning, so as to provide the pilot an easier operation.

SUMMARY OF THE INVENTION

The turn-and-bank indicator according to the present invention which can digitally display the integration with respect to time of the displacement of the pointer of the turn-and-bank indicator, with which the turning rate of the airplane is indicated comprises: a non-contact converter which outputs electrical signals in proportion to the deflection of the pointer, an amplifier which amplifies the output of the converter, an integrator which outputs the integration of the amplifier output with respect to time and a digital display unit which displays the output of the integrator in the position very close to the pointer in the dial of the turn-and-bank indicator.

With the above mentioned structure, the turn-and-bank indicator of this invention can show the turning and bank rate by the pointer as well as the display of the lapsed turning time or angle through the integration with respect to time of the amplifier output.

DESCRIPTION OF PREFERRED EMBODIMENTS

The invention will now be described in further detail with reference to the attached drawings.

The turn-and-bank indicator according to this invention can make an indication of the turning rate with a pointer and also a digital display for the integration with respect to time of the displacement of the pointer of the turn-and-bank indicator, in the form of the display of the turning angle or time.

Figure 1:
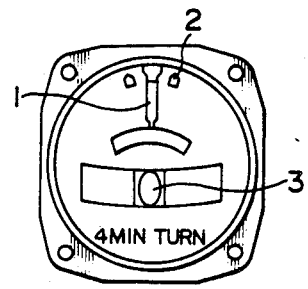
FIG. 1 is a front view showing the general form of disposition of the conventionally known turn-and-bank indicator.
Figure 2:
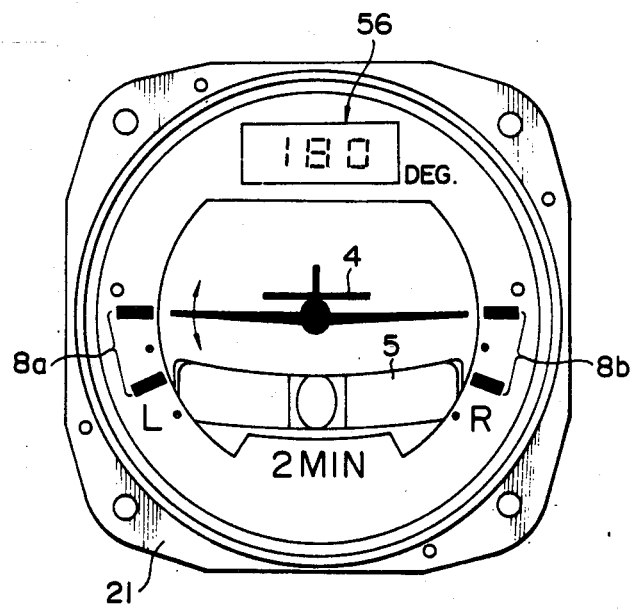
FIG. 2 is a front view of an embodiment of the angle-indication type turn-and-bank indicator according to the present invention.
Figure 3:
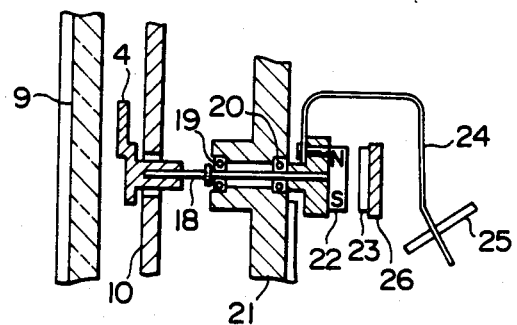
FIG. 3 is a sectional view showing the structure of the non-contact converter in the turn-and-bank indicator according to the present invention.

FIG. 2 is a front view of the first embodiment of the angle-indication type turn-and-bank indicator of this invention, and FIG. 3 is a sectional view of a pointer and the non-contact converter of the turn-and-bank indicator shown in FIG. 2.

A pointer 4 given in FIG. 2 in the form of the back of an airplane is fixed on an axle 18 as shown in FIG. 3. The pointer axle 18 extends through a through hole provided in a frame 21 and rotatably supported thereto with bearings 19 and 20 and with the back end of the axle 18 a permanent magnet 22 and a linkage spring 24 are attached. The spring 24 is held by a connecting pin 25 of the gyro structure, not shown, from which the displacement of the gyro is transmitted.

The numeral 8a shown in FIG. 2 is a scale for the left turning indication and the left side end of the pointer 4 reaches on a thick scale on the line L at the time of the coordinate turning. The numeral 8b likewise indicates a scale for the right turning indication. At the lower side of the pointer 4, there is disposed a bank indicator 5. On the other hand, above the pointer 4, there is provided a digital display unit 56 for an angle indication purpose.

Figure 4:
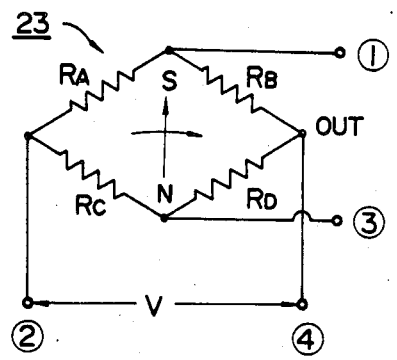
FIG. 4 is a circuit diagram for explaining the operation of the non-contact converter shown in FIG. 3.
Figure 9:
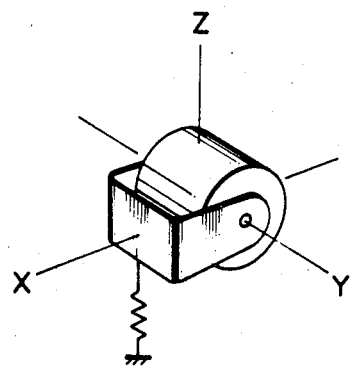
FIG. 9 is a schematic perspective view of a gyro for explaining its axial directions.

Faced with the rotation area of the permanent magnet 22 which is rotatable integrally with the pointer 4, a magnetic sensor 23 is disposed on the non-movable portion 26 of the instrument frame. FIG. 4 shows the circuit of this magnetic sensor 23.

The magnetic sensor 23 is formed by the four bridged and integrated magnetic resistor elements RA, RB, RC and RD made of nickel-cobalt ferromagnetic coating. In the structure shown in FIG. 3, an electrical signal corresponding to the change of the angle of the rotation of the pointer 4 is obtained under the influence of the magnetic flux of the permanent magnet 22.

Figure 5:
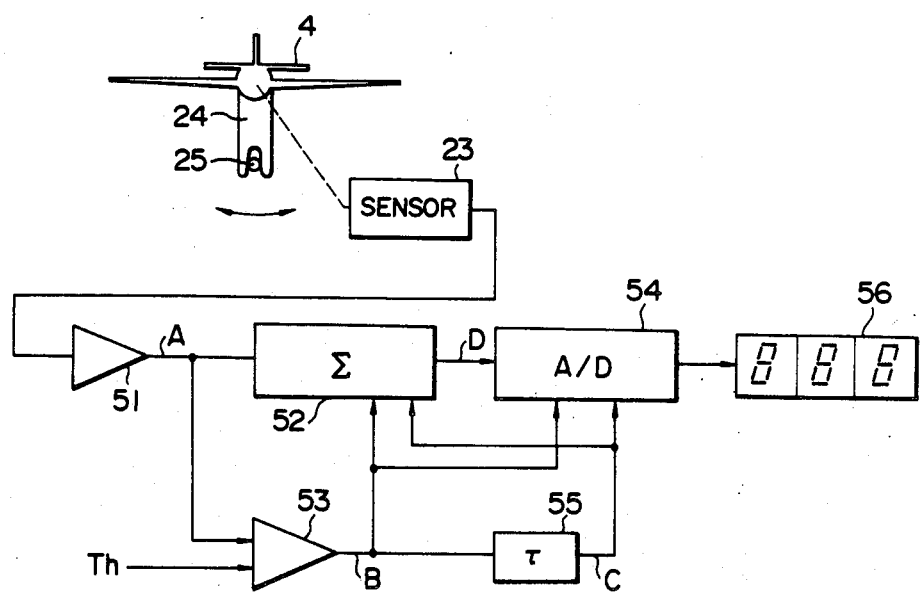
FIG. 5 is a block diagram showing an embodiment of the circuit of the angle-indicating type turn-and-bank indicator of this invention.

FIG. 5 shows a block diagram showing the circuit of the angle-indication type turn-and-bank indicator shown in FIGS. 2 and 3. The electrical signal from the magnetic sensor 23 which corresponds to the rotation angle of the pointer 4 is applied to an amplifier 51 and amplified therein. The output from the amplifier 51 is applied into an integrator 52 and a comparator 53. The output of the comparator 53 is applied into the integrator 52, an A/D converter 54 and a delaying circuit 55. A digital display unit 56 is to display the output of the A/D converter 54 at the position shown in FIG. 2.

Figure 6:
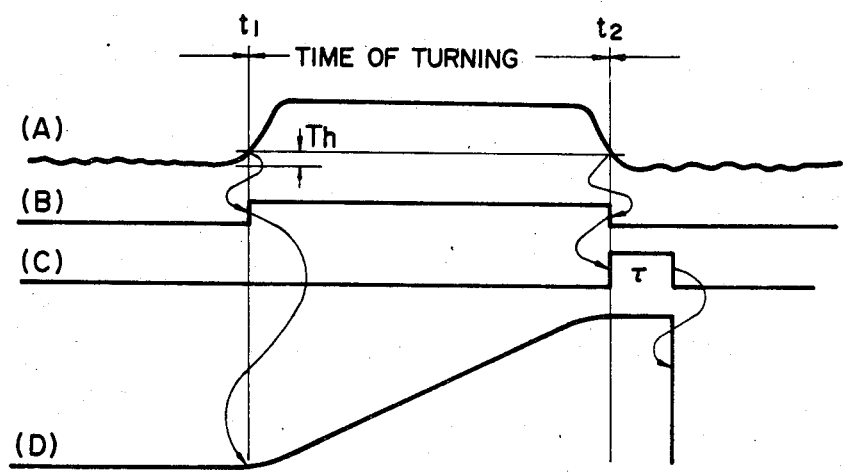
FIG. 6 is waveform diagram for explaining the operation of the circuit of the angle-indication type turn-and-bank indicator according to the present invention.

The operation of the above mentioned circuit structure is explained further with reference to FIG. 6.

An output waveform of the amplifier 51 is shown with the (A) of FIG. 6. When the airplane on which the turn-and-bank indicator of this invention is mounted begins to turn its body, the output of the amplifier 51 increases.

At the time of t1, the output of the amplifier 51 reaches a threshold level Th of the comparator 53, and the comparator 53 generates an output shown in (B) of FIG. 6. The threshold level Th is prepared in order to exclude any fluctuation of the output of the amplifier 51 appearing at the time when the airplane is not turning. As soon as the output of the comparator 53 starts to be generated, the integrator 52 begins integration of the output of the amplifier 51. The output of the integrator 52 is shown in (D) of FIG. 6.

The A/D converter 54 then starts the A/D conversion of the value of integration, which is displayed by the digital display unit 56. The integration value displayed on the digital display unit 56 corresponds to the integration with respect to time of the turning rate or the turning angle, which is given in the digital display unit 56 by the degree of angle.

When the turning of the airplane is going to end, the output of the amplifier 51 decreases and reaches at the time of t2, the threshold level Th of the comparator 53, the output of the comparator 53 becomes zero. After a lapse of a determined time $\tau$ from this time t2, the delaying circuit 55 resets the integrator 52 and A/D converter 54. The display of the digital display unit 56 continues for a determined time $\tau$ (= two of three seconds) from the above mentioned time t2, and automatically disappears. Thus, the pilot of the airplane can obtain a precise turning condition through the pointer 4 and the display of the digital display unit 56.

Figure 7:
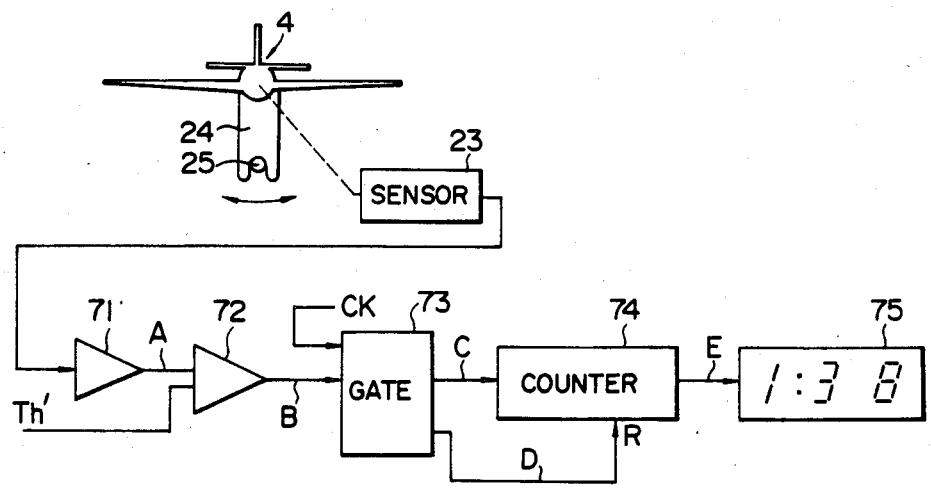
FIG. 7 is a block diagram showing an embodiment of the circuit of the time-indication type turn-and-bank indicator according to this invention.
Figure 8:
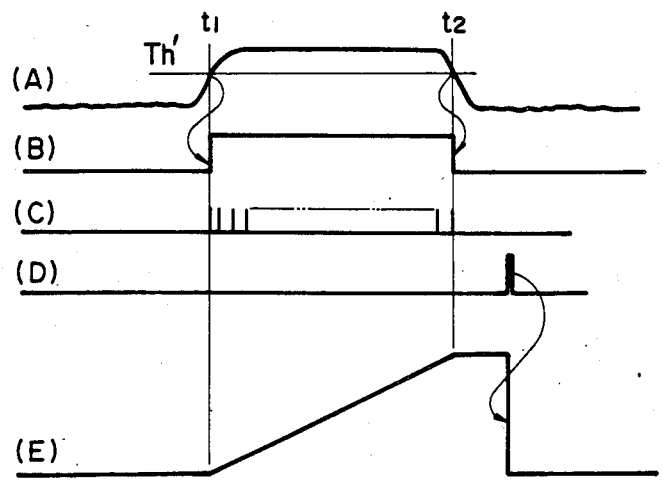
FIG. 8 is a waveform diagram for explaining the operation of the circuit of the time-indication type turn-and-bank indicator according to this invention.

A time-indication type turn-and-bank indicator as the second embodiment of this invention will be described in detail with reference to FIGS. 7 and 8. FIG. 7 is a block diagram showing the circuit of this embodiment of the time-indication type turn-and-bank indicator of this invention, and FIG. 8 is a waveform diagram showing the operation of the circuit of FIG. 7.

The front view of this time-indication type turn-and-bank indicator is almost the same as that shown in FIG. 2, except that in this case the digital display unit 56 of FIG. 2 is the form of the minute and second display 75. The structure of the non-contact converter is just the same as that used in the embodiment of FIG. 2.

An electrical signal from the magnetic sensor 23 which corresponds to the angle of rotation of the pointer 4 is applied into an amplifier 71 and amplified there. The output of this amplifier 71 is applied into a comparator 72. The comparator 72 has a threshold level intermediate of the level Th' corresponding to a constant turning rate, for example the coordinate turning, and that of not turning time.

The output of the comparator 72 is applied to a gate 73, and a clock signal connected to the gate 73 is gated by the output of the comparator 72 and is applied into a counter 74.

The counter 74 is a clock counter which counts 60 and it integrates the time of the output of the amplifier 71 in units of a second, while they exceed a predetermined value. A digital display unit 75 displays the result of the counter 74.

The operation of the above circuit and the further detailed structure of the device will be explained with reference to FIG. 8.

An output waveform of the amplifier 71 is shown with the (A) of FIG. 8. When the airplane carrying this turn-and-bank indicator of this second embodiment starts the turning, the output of the amplifier 71 increases. At the time of t1, the output reaches the threshold level Th' of the camparator 72, and the comparator 72 generates an output shown in (B) of FIG. 8.

The threshold level Th' of this embodiment is set rather higher than in the case of the first embodiment, and therefore when the output from the comparator 72 reaches this level, it can be taken that the airplane already started its turning.

A gate output of the gate 73 is shown in (C) of FIG. 8. As is shown in (D) gate 73 sends a reset signal into the counter 74 after the lapse of a determined period from the time t2, corresponding to the time when the output from the comparator 72 becomes zero. Thus the counter 74 is reset. The display of the digital display unit 75 continues for a determined time $\tau$ (two or three seconds) from the time t2 and will then automatically disappear, as shown in (E).

The pilot can therefore confirm precisely the length of time while the airplane keeps its turning state by the indication of the pointer 4 and the display of the digital display unit 75. The turn-and-bank indicator according to the present invention can thus lessen the difficulty of the operation for the pilot.

What is claimed is:

1. A turn-and-bank indicator which integrates the displacement of a pointer of the turn-and-bank indicator with respect to time, the pointer indicating the turning rate of an airplane, comprising:
   a non-contact converter which outputs an electrical signal in proportion to the deflection of the pointer;
   an amplifier which amplifies the output of the non-contact converter;
   an integrator which obtains an integration of the output of the amplifier with respect to time; and
   a digital display unit which displays the output from the integrator, the digital display unit being positioned adjacent the pointer, wherein the integrator for obtaining the integration of the output of the amplifier with respect to time integrates the time corresponding to a period when the output of the amplifier exceeds a predetermined level which is attained during turning of the airplane, and wherein the digital display displays units of time.

2. A turn-and-bank indicator according to claim 1, wherein the non-contact converter comprises a permanent magnet which is integrally rotatable with the pointer, and a magnetic sensor disposed adjacent the permanent magnet.

3. A turn-and-bank indicator for an aircraft, comprising:
   a rotatably mounted shaft;
   a pointer affixed to the shaft;
   a gyro;
   means for operatively connecting the gyro to the shaft to displace the pointer from a predetermined position when the aircraft turns;
   means for generating an electrical signal having a magnitude that depends upon the displacement of the pointer;
   means, responsive to the means for generating, for comparing the electrical signal to a predetermined threshold value;
   means, responsive to the means for generating and to the means for comparing, for integrating the electrical signal when it exceeds the predetermined threshold value; and
   means for displaying the result of the integration at least as long as the electric signal exceeds the predetermined threshold value, said means for displaying including
      an A/D converter that is connected to the maens for comparing and the means for integrating,
      a digital display connected to the A/D converter, and
      delay circuit means, connected between the means for comparing and the A/D converter, for maintaining the display for a predetermined period after the electric signal has fallen below the predetermined threshold value.

4. A turn-and-bank indicator according to claim 3, wherein the means for generating an electrical signal comprises a non-contact converter having a first portion which is operatively connected to the shaft and having a second portion which is disposed adjacent the first portion but which is not connected to the shaft, one of said portions providing a displacement signal, and means for amplifying the displacement signal to provide the electric signal.

5. A turn-and-bank indicator which integrates the displacement of a pointer of the turn-and-bank indicator with respect ot time, the pointer indicating the turning rate of an airplane, conprising:
   a non-contact converter which outputs an electrical signal in proportion to the deflection of the pointer;
   an amplifier which amplifies the output of the non-contact converter;
   an integrator which obtains an integration of the output of the amplifier with respect to time; and
   a digital display unit which displays the output from the integrator, the digital display unit being positioned adjacent the pointer,
   wherein the integrator for obtaining the integration of the output of the amplifier with respect to time integrates the time corresponding to a period when the output of the amplifier exceeds a predetermined level which is greater than the output of the amplifier when the airplane is not turning, and wherein the digital display displays angular units.

6. A turn-and-bank indicator according to claim 5, wherein the non-contact converter comprises a permanent magnet which is integrally rotatable with the pointer, and a magnetic sensor disposed adjacent the permanent magnet.

* * * * *